United States Patent
Mayhead et al.

(10) Patent No.: US 7,987,269 B1
(45) Date of Patent: Jul. 26, 2011

(54) ADMINISTRATIVE GROUPING OF NETWORK RESOURCES

(75) Inventors: Martin Paul Mayhead, Hindhead (GB); Michael J. Wookey, Los Gatos, CA (US); Brandon Eugene Taylor, Wellington, MO (US)

(73) Assignee: Sun Microsystems, Inc., Santa Clara, CA (US)

( * ) Notice: Subject to any disclaimer, the term of this patent is extended or adjusted under 35 U.S.C. 154(b) by 563 days.

(21) Appl. No.: 11/958,586

(22) Filed: Dec. 18, 2007

(51) Int. Cl.
*G06F 15/173* (2006.01)
(52) U.S. Cl. .................................. 709/226; 709/218
(58) Field of Classification Search .................. 709/218, 709/223, 226, 229
See application file for complete search history.

(56) References Cited

U.S. PATENT DOCUMENTS

| | | |
|---|---|---|
| 2003/0033387 A1 | 2/2003 | Adams et al. |
| 2003/0195904 A1 | 10/2003 | Chestnut et al. |
| 2004/0143492 A1 | 7/2004 | Howell et al. |
| 2005/0044197 A1 | 2/2005 | Lai |
| 2009/0235330 A1* | 9/2009 | Byun et al. .................. 726/4 |

* cited by examiner

*Primary Examiner* — Joseph E Avellino
*Assistant Examiner* — Marshall McLeod
(74) *Attorney, Agent, or Firm* — Brooks Kushman P.C.

(57) ABSTRACT

A domain manager establishes an administrative domain for a network that has an associated set of assets and an associated set of users. The domain manager identifies at least one asset of the set of assets to be included in the administrative domain. An asset can be a hardware resource (e.g., computer, router, etc.) and/or a software resource (e.g., word processing application). In addition, the domain manager identifies at least one user of the set of users to be included in the administrative domain. The domain manager also establishes a set of roles within the administrative domain. For example, each role can define permissions (e.g., levels of accessibility) between a user and an asset (or group of assets) in the administrative domain.

5 Claims, 10 Drawing Sheets

ADMINISTRATIVE GROUPING OF NETWORK RESOURCES

BACKGROUND

Conventional technologies for product installation (i.e., software and/or hardware) typically give a user (performing the product installation) an opportunity to register the product. Registering a product provides benefits for both the user and the supplier of the product. The user may receive notices associated with the product, and product updates (for example, software updates) for the product. When users register products, the suppliers of the products gain insight into the client base using the products.

Typically, a user (such as the user performing the installation of the product) is assigned the task of registering the products. Each product is registered individually (i.e., each separate piece of hardware, each software package installed, etc.) During the installation and/or setup of product, the user is prompted to begin the registration task. The user typically fills information in data fields on a graphical user interface. The information supplied by the user may include information associated with the organization using the products, other hardware and/or software products that interface with the product being registered, etc. The information supplied by the user is then transmitted to the supplier of the product.

SUMMARY

Conventional product registration systems suffer from a variety of deficiencies. In particular, one such deficiency exists when a product (e.g., hardware resources, software resources, etc.) changes ownership or, similarly, when the responsibility for administration and operation of network assets changes. In such circumstances, conventional product registration systems are not capable of tracking and accommodating such changes in product ownership and/or network administration. More specifically, conventional product registration systems are unable to accommodate such changes in terms of the applicability and right to receive product support and services (e.g., software/firmware updates, security patches, etc.) as well as the administrative associations (e.g., permissions afforded to users of the network resources).

Certain example embodiments disclosed herein overcome such drawbacks, as well as other drawbacks in the art. For example, embodiments disclosed herein provide a grouping service that allows clients (e.g., companies, customers of the product manufacturer or its agents, etc.) the capability of forming arbitrary associations between the clients' identified representatives (such as system administrators). The grouping service also provides for creation of arbitrary associations among clients' assets (e.g., hardware and software resources accessible by a network) and certain permissions and privileges associated with those assets.

As an example, assume that when a product (e.g., workstation) is registered a user identifies the product to the registration system and a group membership is assigned to the product. With such group membership, the product is entitlement to support, services, etc. (e.g., software updates, patches, etc.) and ownership privileges associated with the group rather than with the individual user that registered the product.

In another embodiment, assume that a product moves between administrative groups (e.g., a workstation is moved from the Accounting group to the Sales group, each having a respective administrative group). To accommodate the transient nature of company resources, the grouping service performs a "scan" of group resources to identify all products that are not associated with the group. By identifying resources that are not associated (e.g., not registered) with a given administrative group, the grouping service provides an opportunity to re-register those resources with the appropriate group association. This re-registration can then trigger subsequent changes to support and services as required.

Note also that when a product changes ownership the same procedure applies. For example, assume that a workstation is sold from Company A to Company B. In such a scenario, before the workstation would be eligible for support and services as provided by its new owner, Company B, the workstation must be registered with administrative group associated with Company B. According to one embodiment, the grouping service detects that the product is registered to a different group (associated with a different customer/company) and initiates a re-registration. Having re-registered with Company B, the workstation can now avail itself of the support and service provided by Company B.

More specifically, embodiments herein disclose a domain manager (e.g., grouping service) that establishes an administrative domain for a network that has an associated set of assets and an associated set of users. The domain manager identifies at least one asset of the set of assets to be included in the administrative domain. An asset can be a hardware resource (e.g., computer, router, etc.) and/or a software resource (e.g., word processing application, Computer Aided Design "CAD" tool, etc.). In addition, the domain manager identifies at least one user of the set of users to be included in the administrative domain. The domain manager also establishes a set of roles within the administrative domain. For example, each role can define permissions (e.g., levels of accessibility) between a user and an asset (or group of assets) in the administrative domain.

In another example embodiment, for each asset in the administrative domain, the domain manager determines whether that asset has an associated service tag. A service tag is provided by a registration client that manages registration of assets in the administrative domain. For example, the service tag can identify context information associated with the asset such as a unique identifier, registration data, etc. Note that the registration client can execute on behalf of the domain manger as part of the same process or as a separate process.

In response to determining that the asset does not have an associated service tag, the domain manager initiates re-registration of the asset with the administrative domain via the registration client. The registration client provides the asset with a unique service tag, if applicable, upon registration with the administrative domain. In this manner, the unique service tag is indicative of asset membership with the administrative domain.

The methods for implementing service tags as administered by a registration client are augmented by techniques discussed in co-pending U.S. patent application Ser. No. 11/956,894, entitled "METHODS AND APPARATUS FOR DISCOVERY DRIVEN PRODUCT REGISTRATION", and co-pending U.S. patent application Ser. No. 11/956,842, entitled "METHODS AND APPARATUS FOR MANAGING ASSETS USING SERVICE TAGS", each of which is incorporated herein by this reference.

According to another embodiment, the domain manager establishes an asset subgroup hierarchically nested within the administrative domain. The asset subgroup can define a relationship among assets registered with the administrative domain. For example, in one embodiment the domain manager defines the asset subgroup according to an asset type (e.g., Unix hosts, Solaris hosts, etc.). Moreover, the administrative domain can then provides update services to assets according to asset type (e.g., software updates specific to the Unix or Solaris systems).

Other embodiments disclosed herein include any type of computerized device, workstation, handheld or laptop computer, or the like configured with software and/or circuitry (e.g., a processor) to process any or all of the method operations disclosed herein. In other words, a computerized device such as a computer or a data communications device or any type of processor that is programmed or configured to operate as explained herein is considered an embodiment disclosed herein.

In addition, other embodiments disclosed herein include software programs to perform the steps and operations summarized above and disclosed in detail below. One such embodiment comprises a computer program product that has a computer-readable medium including computer program logic encoded thereon that, when performed in a computerized device having a coupling of a memory and a processor, programs the processor to perform the operations disclosed herein. Such arrangements are typically provided as software, code and/or other data (e.g., data structures) arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC). The software or firmware or other such configurations can be installed onto a computerized device to cause the computerized device to perform the techniques explained as embodiments disclosed herein.

It is to be understood that the system disclosed herein may be embodied strictly as a software program, as software and hardware, or as hardware alone. The embodiments disclosed herein, may be employed in computerized devices and software systems for devices such as those manufactured by Sun Microsystems, Inc. of Santa Clara, Calif.

Additionally, although each of the different features, techniques, configurations, etc. herein may be discussed in different places of this disclosure, it is intended that each of the concepts can be executed independently of each other or in combination with each other. Accordingly, the present invention can be embodied and viewed in many different ways.

Also, note that this summary section herein does not specify every embodiment and/or incrementally novel aspect of the present disclosure or claimed invention. Instead, this summary only provides a preliminary discussion of different embodiments and corresponding points of novelty over conventional techniques. For additional details and/or possible perspectives (permutations) of the invention, the reader is directed to the Detailed Description section and corresponding figures of the present disclosure as further discussed below.

BRIEF DESCRIPTION OF DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, with emphasis instead being placed upon illustrating the embodiments, principles and concepts of the invention.

DETAILED DESCRIPTION

Embodiments disclosed herein provide a domain manager that allows clients (e.g., companies, customers of the product manufacturer or its agents, etc.) the capability of forming arbitrary associations between the clients' identified representatives (such as system administrators). The domain manager also provides for creation of arbitrary associations among clients' assets (e.g., hardware and software resources accessible by a network) and certain permissions and privileges associated with those assets. In particular, such associations enable an automated and seamless approach for managing product registration/re-registration and system administration when assets and users of those assets transition between organizations.

Figure 1:
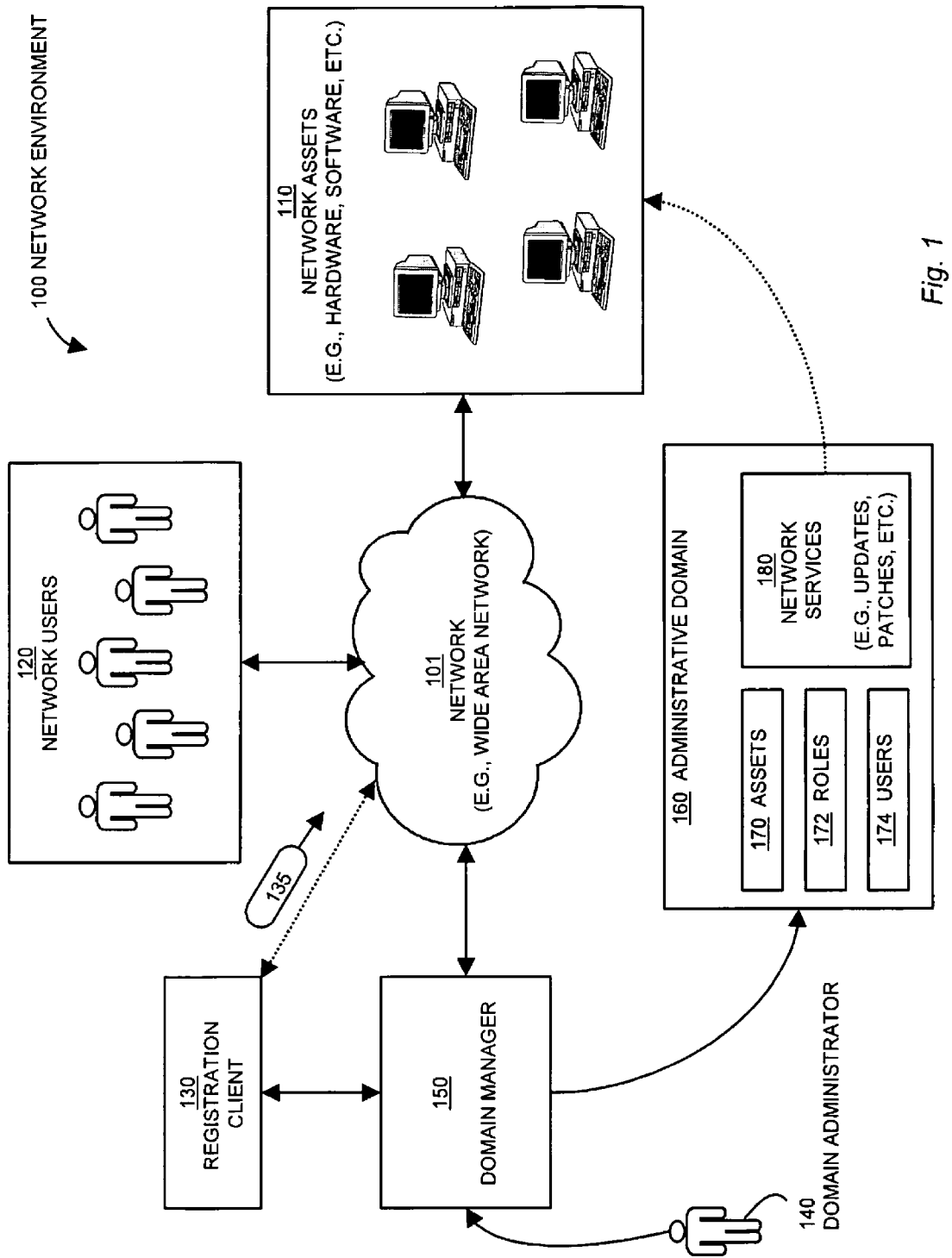
FIG. 1 is an example block diagram of a network environment illustrating creation and implementation of an administrative domain according to embodiments herein.

FIG. 1 is an example block diagram of a network environment 100 illustrating creation and implementation of an administrative domain according to embodiments herein.

In the example embodiment shown, network environment 100 includes a network 101 (e.g., Local Area Network "LAN", Wide Area Network "WAN", the Internet, etc.), network assets 110, network users 120, registration client 130 and service tag(s) 135, domain administrator 140, domain manager 150 and administrative domain 160. More specifically, administrative domain 160 includes a set of assets 170, a set of users 172, a set of roles 174 and network services 180 (e.g., software upgrades, security patches, etc.).

The network assets 110 can include any type of hardware and/or software resources that are accessible by network 101. For instance, network assets 110 can include hardware resources such as personal computers, laptops, workstations, networking equipment (e.g., routers, gateways, etc.), data storage units, etc. Additionally, network assets 110 can include software resources such as, for example, operating systems (e.g., Unix, Solaris, etc.), user-level applications (e.g., word processing tools, image processing tools, etc.), device drivers, etc.

During general operation, the domain manager 150 creates an administrative domain 160 that establishes arbitrary associations between certain network assets. Typically, the domain administrator 140 (e.g., super-user) provides details of the administrative domain architecture by defining assets groups and roles within the administrative domain 160, as will be discussed in more detail with respect to FIGS. 2 and 3.

The domain administrator can also determine which users are to be included in the administrative domain 160 by inviting those users to join the administrative domain 160 as a member. In the same vein, each user that is invited to join the administrative domain 160 can be assigned one role by the domain administrator 140. Furthermore, each user's role can dictate the level of accessibility (e.g., read access, write access, read/write access, etc.) that a user has with respect to certain assets in the administrative domain 160.

In one embodiment, each asset in the set of assets 170 must be registered with the domain manager 150 (or, alternatively, with the registration client 130) in order to receive any service and/or support provided by the administrative domain 160. The registration client 130 registers a particular asset by providing that asset with a service tag 135. A service tag 135 is similar to a cookie in that it resides on a device (e.g., network asset) and contains information specific to that device that can be updated, modified, retrieved, etc., by a remote process (e.g., registration client 130) from across a network 101. In one embodiment, the service tag 135 includes contextual data regarding a particular network asset such as, for example, a unique identifier value, registration information (e.g., start date, expiration date, groups/domains to which the asset is registered, etc.), local resource information (e.g., operating system, hardware configurations, etc.), and so on.

As previously mentioned, the administrative domain 160 provides support and services (e.g., network services 180 such as software upgrades, security patches, etc.) to assets that are a member of the administrative domain 160 and that are also currently registered with the administrative domain 160. Note that the administrative domain 160, domain manager 150 and/or registration client 130 do not necessarily provide network services 180 directly to the network assets 110. Instead, as in one embodiment, the administrative domain 160 initiates administration of network services 180 by delegating those tasks to another process in network 101.

Figure 2:
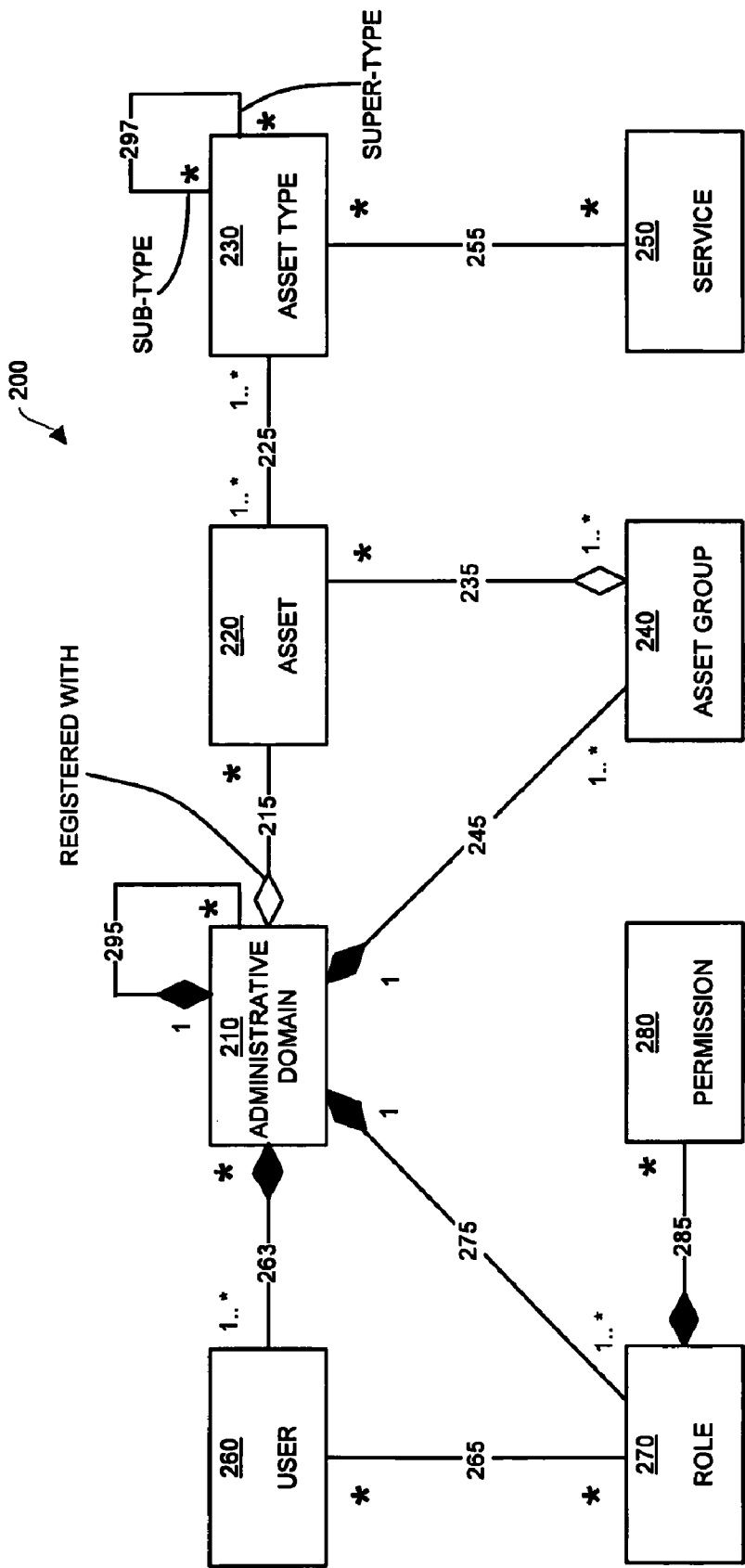
FIG. 2 is an example block diagram of a relational model illustrating the relationship among various administrative entities according to embodiments herein.

FIG. 2 is an example block diagram of an administrative relational model 200 illustrating the relationship among various administrative entities according to embodiments herein.

In the example embodiment shown, administrative relational model 200 includes an administrative domain class 210, an asset class 220, an asset type class 230, an asset group class 240, a service class 250, a user class 260, a role class 270 and a permission class 280.

In general, an administrative domain is an instantiation of the administrative domain class 210 that defines an administrative context containing users and assets along with the roles that administratively relate the users with the assets.

A user is an instantiation of the user class 260 representing an individual or organization that accesses the network assets (e.g., company property such as hardware and/or software resources in the same identity domain).

An asset is an instantiation of the asset class 220 representing an item owned by and providing value for an individual or organization.

An asset group is an instantiation of the asset group class 240 representing a collection of assets implying an arbitrary relationship between the constituent assets.

A role is an instantiation of the role class 270 representing a job function within the context of an administrative domain that has associated semantics regarding the authority and responsibility conferred on the user assigned to the role.

A permission is an instantiation of the permission class 280 that defines the ability or right to perform an operation on a resource (e.g., an administrative domain, asset group, etc.) in accordance with specified conditions.

A service is an instantiation of the service class 250 representing a resource (e.g., an informational web page, a portal, etc.) that is relevant to one or more types of assets.

Referring still to FIG. 2, the administrative domain class 210 can include one or more users as shown by relational connector 263. In one embodiment, the administrative domain class 210 requires one user that is assigned a "super-user" role for that particular domain.

Additionally, the administrative domain class 210 contains one or more roles with permissions as shown by relational connector 275. Such roles and associated permissions entitle users to operate against entities within the administrative scope of the domain. According to one embodiment, the administrative domain has at least one "Super-user" role that confers all privileges against all entities within that particular domain. For example, the domain administrator 140 in FIG. 1 is the super-user of administrative domain 160.

Note that the administrative domain class 210 can have zero or more assets registered therewith as shown by relational connector 215.

Further note that the administrative domain class 210 can contain one or more asset groups (as shown by relational connector 245) that are capable of containing assets registered with the domain. For example, in one embodiment the administrative domain class 210 contains a "Global" group that contains all assets registered with that particular domain.

In one embodiment, the administrative domain class 210 can contain zero or more administrative sub-domains nested hierarchically within the top-level administrative domain (each of which, as an administrative domain in its own right, can recursively contain other sub-domains). Such recursive nesting is represented by relational connector 295. Per this embodiment, each sub-domain has a single parent.

Still referring to the example embodiment of FIG. 2, note that the user class 260 can be affiliated with multiple administrative. Roles assigned to the user can differ across these Administrative Domains. For example, a user can be assigned a "super-user" role for administrative domain X while that same user is assigned a lesser role (e.g., read access only) for administrative domain Y.

According to one embodiment, a user can be assigned one or more roles for a given administrative domain. Note that a user must have at least one role assigned in order to perform operations within the scope of the administrative domain.

It should be appreciated that a user is not associated directly with an asset, an asset group, or a permission. As a result, revocation of a user's right to manage assets controlled by an administrative domain can be achieved by merely dissociating the roles from the user and, thus, terminating any undesired permissions.

Unlike users, assets can be registered with exactly one administrative domain. Nonetheless, each asset registered with an administrative domain can be contained by one or more asset groups within that particular domain as shown by relational connector 235. In one embodiment, each asset is at least contained in the "Global" asset group for that administrative domain.

Note that an asset can be classified as belonging to one or more asset types. For example, a Solaris 10 asset can be classified using the following types: "Software", "Operating System", "Solaris", and "Solaris 10". According to one embodiment, asset types are arranged hierarchically (e.g., "Software"←"Operating System"←"Solaris"←"Solaris 10", where "←" implies that the type on the left is a super-type of the type on the right). Regarding the asset type class 230, the relationship of sub-types vis-à-vis super-types is shown by relational connector 297.

In another embodiment, the asset group class 240 is contained within exactly one administrative domain. As previously mentioned, a default asset group "Global" is provided for every administrative domain and contains all of the assets registered with that particular domain.

As its name suggests, an asset group can contain zero or more assets. Note that an asset should not be included more than once in any given asset group (e.g., an asset group exhibits set semantics). According to one embodiment, the asset group class 240 can only contain assets registered with the administrative domain in which the asset group is contained.

Similar to sub-domains, an asset group can contain zero or more hierarchically nested asset groups, or asset subgroups. It is also possible for an asset group to be contained within one or more asset groups.

Referring still to FIG. 2, the service class 250 can be associated with zero or more asset types; thus, expressing relevance to the asset instances of that asset type. Moreover, an asset type can have zero or more associated services as shown by relational connector 255.

During operation, the role class 270 can be assigned to zero or more users in an administrative domain as shown by relational connector 265. In one embodiment, the "super-user" role must be assigned to at least one user in the administrative domain.

As shown by relational connector 285, the role class 270 is composed of zero or more permissions. On the other hand, a permission instance belongs to exactly one role.

Note that a permission instance can convey permission to perform one or more types of operations against one or more resource types or instances.

Figure 3:
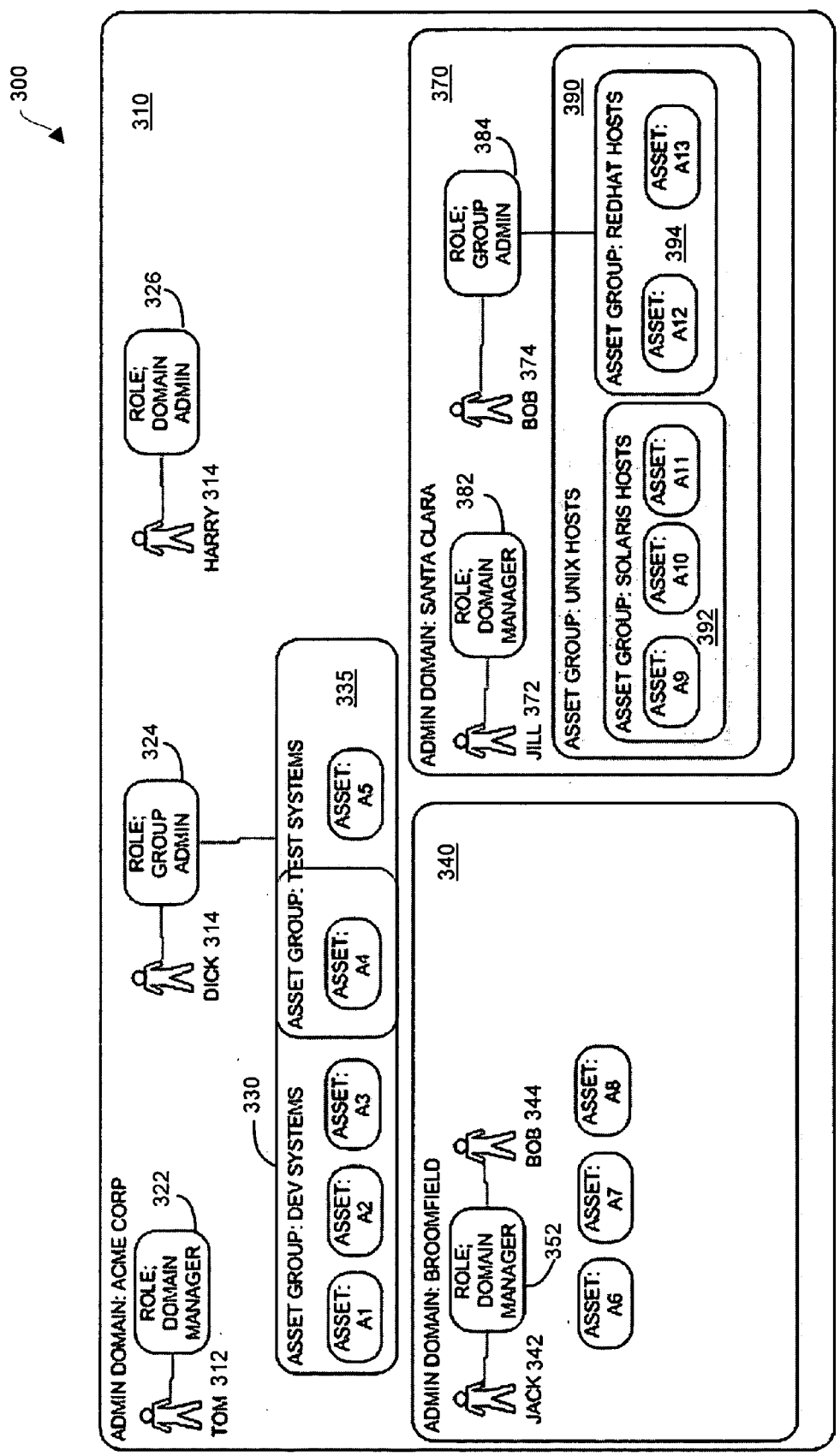
FIG. 3 is an example block diagram illustrating an implementation of an administrative environment according to embodiments herein.

According to one embodiment, roles support privileges/permissions (object-operation associations) such as:
  Read/View
  Write/Configure
  Update
  Register
  Provision
  Monitor FIG. 3 is an example block diagram illustrating an implementation of an administrative environment 300 according to embodiments herein.

In the example embodiment shown, administrative environment 300 includes administrative domain 310 (e.g., "Acme Corp"), administrative domain 340 (e.g., "Broomfield") and administrative domain 370 (e.g., "Santa Clara"). Administrative domain 310 includes user Tom 312, user Dick 314 and user Harry 316. User Tom 312 is assigned role 322 (e.g., "Domain Manager"), user Dick 314 is assigned role 324 (e.g., "Group Admin" of asset group 335) and user Harry 316 is assigned role 326 (e.g., "Domain Admin"). In addition, administrative domain 310 includes asset group 330 (e.g., "Dev Systems) containing assets A1, A2 and A3, as well as asset group 335 (e.g., ("Test Systems") containing assets A4 and A5. Note that asset A4 is contained in both asset group 330 and asset group 335.

Administrative domain 340 (e.g., "Broomfield") is a sub-domain of administrative domain 310 (e.g., "Acme Corp"). As shown in FIG. 3, administrative domain 340 includes user Jack 342 and user Bob 344 having been both been assigned role 352 (e.g., "Domain Manager"). Also contained in administrative domain 340 are assets A7, A8 and A9. Note that administrative domain 340 does not have any asset groups.

Administrative domain 370 (e.g., "Santa Clara") is also a sub-domain of administrative domain 310 (e.g., "Acme Corp"). In this example, administrative domain 370 includes user Jill 372 and user Bob 344 having been assigned role 382 (e.g., "Domain Manager") and role 384 (e.g., "Group Admin" of asset subgroup 394), respectively. Note that user Bob 344 is a member of both administrative domain 340 and 370. Further note that user Bob 344 has been assigned different roles (e.g., role 352 and role 384) in each respective sub-domain.

In the example embodiment of FIG. 3, administrative domain 370 includes asset group 390 (e.g., "Unix Hosts") that contains nested asset subgroup 392 (e.g., "Solaris Hosts") and nested asset subgroup 394 (e.g., "Red Hat Hosts"). As such, asset subgroup 392 contains assets A9, A10 and A11, while asset subgroup 394 contains assets A12 and A13.

According to the example embodiment of FIG. 3, the "Domain Manager" role is representative of the "super-user" role for that particular domain. However, although roles 322, 352 and 382 each have the same definition (e.g., "Domain Manager" or "super-user"), these roles do not necessarily confer the same privileges/permissions to their respective user assignees. For example, role 352 confers domain manager privileges/permissions to user Jack 342 and user Bob 344 only for administrative domain 340. In the same vein, role 382 confers domain manager privileges/permissions to user Jill 372 only for administrative domain 370.

Furthermore, in one embodiment, role 322 confers domain manager privileges/permissions to user Tom 312 for administrative domain 310 as well as any sub-domains (e.g., administrative domain 340 and administrative domain 370). In an alternate embodiment, role 322 does not confer privileges/permissions to any sub-domains, thus user Tom 312 would only have domain manager status with respect to administrative domain 310.

It should also be pointed out that the administrative domains shown in FIG. 3 can be organized according to different logical configurations. For example, administrative domains 340 and 370 are organized according to proximity (e.g., the Broomfield location and the Santa Clara location). In another embodiment, administrative domains (or sub-domains) can be organized according to logical business units such as Accounting, Sales, Marketing, Engineering, etc.

Figure 4:
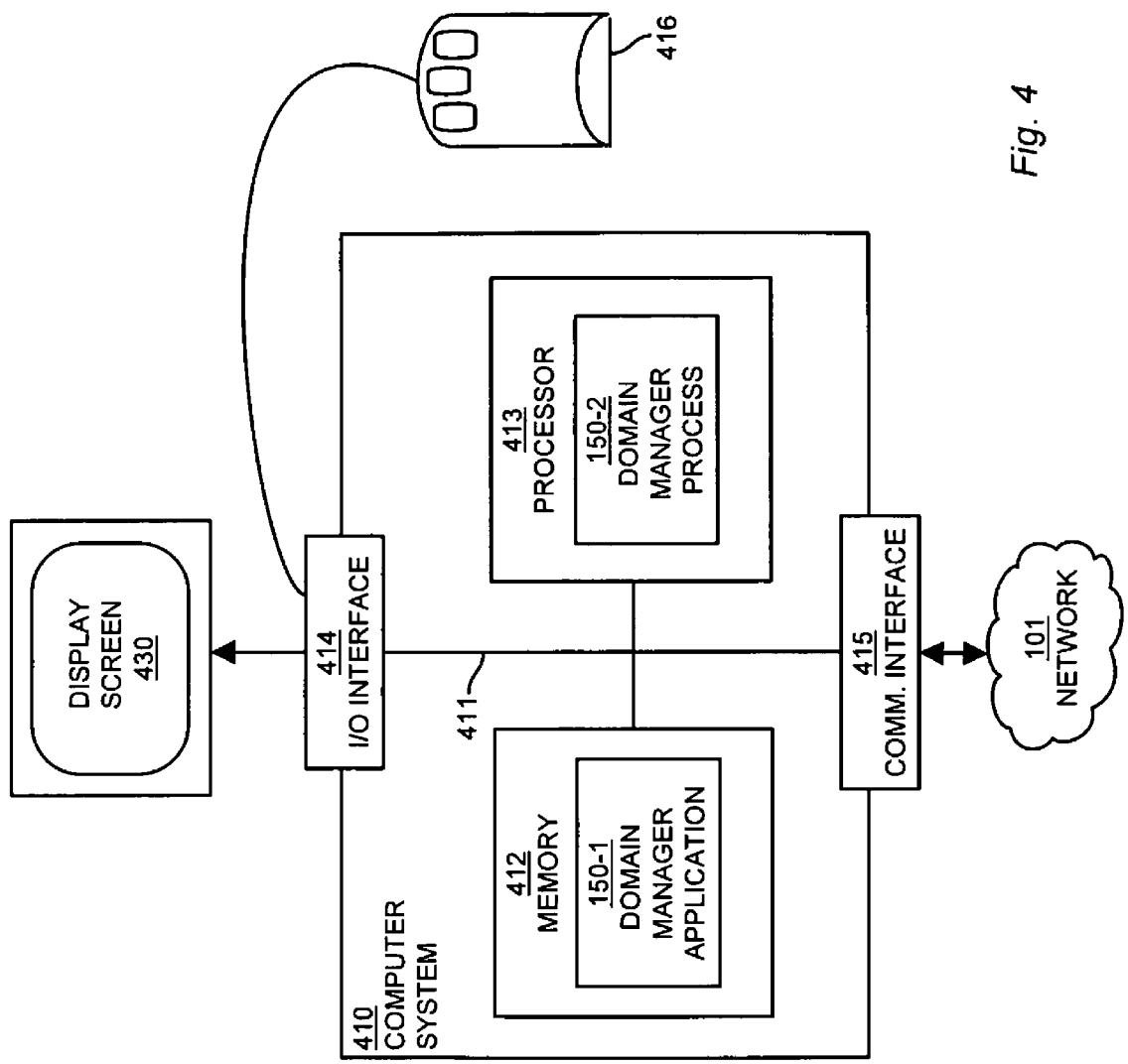
FIG. 4 is a block diagram illustrating an example computer system for executing a domain manager and related functions/processes according to embodiments herein.

FIG. 4 is a block diagram illustrating an example computer system 410 for executing a domain manager 150 and related functions/processes according to embodiments herein. Computer system 410 may be a computerized device such as a personal computer, workstation, portable computing device, console, network terminal, processing device, etc.

As shown, computer system 410 of the present example includes an interconnect 411 that couples a memory system 412, a processor 413, an I/O interface 414, and a communications interface 415. I/O interface 414 enables computer system 410 to display a graphical user interface on display screen 430. An input device 416 (e.g., one or more user/developer controlled devices such as a pointing device, keyboard, mouse, etc.) couples to processor 413 through I/O interface 414, and enables a user (e.g., domain administrator 140) to provide input commands and generally control the graphical user interface that a domain manager application 150-1 and a domain manager process 150-2 provides for display on display 430. Communications interface 415 of computer system 410 enables computer system 410 to communicate over network 101 to transmit and receive information from different resources.

As shown, memory system 412 is encoded with domain manager application 150-1 supporting domain administration and automated product registration processing and other functions according to embodiments herein. Domain manager application 150-1 can be embodied as software code such as data and/or logic instructions (e.g., code stored in the memory or on another computer readable medium such as a disk) that support functionality according to different embodiments described herein.

During operation of domain manager application 150-1, processor 413 accesses memory system 412 via the interconnect 411 in order to launch, run, execute, interpret or otherwise perform the logic instructions of the domain manager application 150-1.

Execution of the domain manager application 150-1 produces processing functionality in domain manager process 150-2. In other words, the domain manager process 150-2 represents one or more portions of the domain manager application 150-1 (or the entire application) performing within or upon the processor 413 in the computer system 410.

It should be noted that domain manager process 150-2 executed in computer system 410 can be represented by either one or both of the domain manager application 150-1 and/or the domain manager process 150-2. For purposes of this discussion and different embodiments herein, general reference will again be made to the domain manager process 150-2 as performing or supporting the various steps and functional operations as previously discussed and as will be discussed further in this specification.

As mentioned, in addition to the domain manager process 150-2, embodiments herein include the domain manager application 150-1 itself (i.e., the un-executed or non-performing logic instructions and/or data). The domain manager application 150-1 may be stored on a computer readable medium such as a floppy disk, hard disk, or optical medium. The domain manager application 150-1 may also be stored in a memory type system such as in firmware, read only memory (ROM), or, as in this example, as executable code within the memory system 412 (e.g., within Random Access Memory or RAM). In addition to these embodiments, it should also be noted that other embodiments herein include the execution of domain manager application 150-1 in processor 413 as the domain manager process 150-2. Thus, those skilled in the art will understand that the computer system 410 may include other processes and/or software and hardware components, such as an operating system that controls allocation and use of hardware resources.

FIGS. 5-10 include flowcharts according to embodiments herein. Each step denotes one or more computer software instructions or groups of instructions or hardware logic that carry out such functionality. The flow diagrams do not necessarily depict the syntax of any particular programming language. Rather, the flow diagrams illustrate the functional information one of ordinary skill in the art could use to fabricate hardware circuits and/or to generate computer software (or a hybrid of both hardware circuits and software code) to carry out the features as described herein.

It should be noted that many routine program elements, such as initialization of loops and variables and the use of temporary variables are inherent in the flowcharts. It will be appreciated by those of ordinary skill in the art that unless otherwise indicated herein, the particular sequence of steps described is illustrative only and can be varied without departing from the spirit of the invention. Thus, unless otherwise stated the steps described below are unordered meaning that, when possible, the steps can be performed in any convenient or desirable order.

Figure 5:
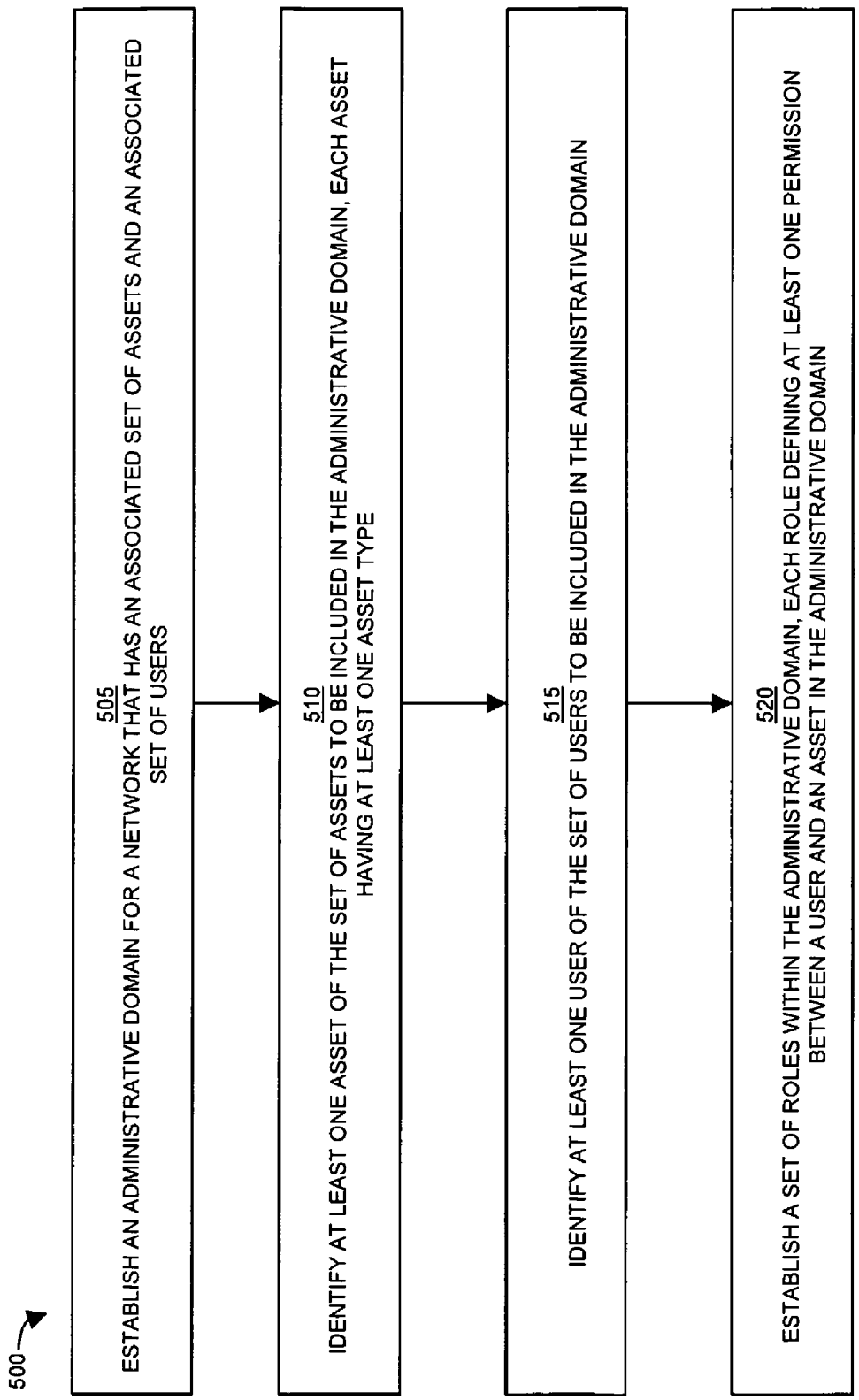
FIG. 5 is a flow chart of processing steps that shows processing operations performed by a domain manager in accordance with one example embodiment.

Now, more specifically, FIG. 5 is a flow chart 500 of processing steps that shows processing operations performed by the domain manager 150 in accordance with one example embodiment.

In step 505, the domain manager 150 establishes an administrative domain for a network that has an associated set of assets and an associated set of users. In this manner, each asset represents at least one of a software resource and a hardware resource detectable by the network.

In step 510, the domain manager 150 identifies at least one asset of the set of assets to be included in the administrative domain, wherein each asset has at least one asset type. As shown in the example embodiment of FIG. 3, asset A4 has an asset type "Dev Systems" and an asset type "Test Systems" since asset A4 is contained within respective asset groups 330 and 335.

In step 515, the domain manager 150 identifies at least one user of the set of users to be included in the administrative domain. As previously discussed, users can be included in the administrative domain by receiving and subsequently accepting a request or invitation to join the administrative domain. Typically, such a request or invitation is provided by the administrative domain "super-user" or domain manager (e.g., domain administrator 140 in FIG. 1).

In step 520, the domain manager 150 establishes a set of roles within the administrative domain. Each role can define permissions (e.g., levels of accessibility and authority) between a user and an asset in the administrative domain.

Figure 6:
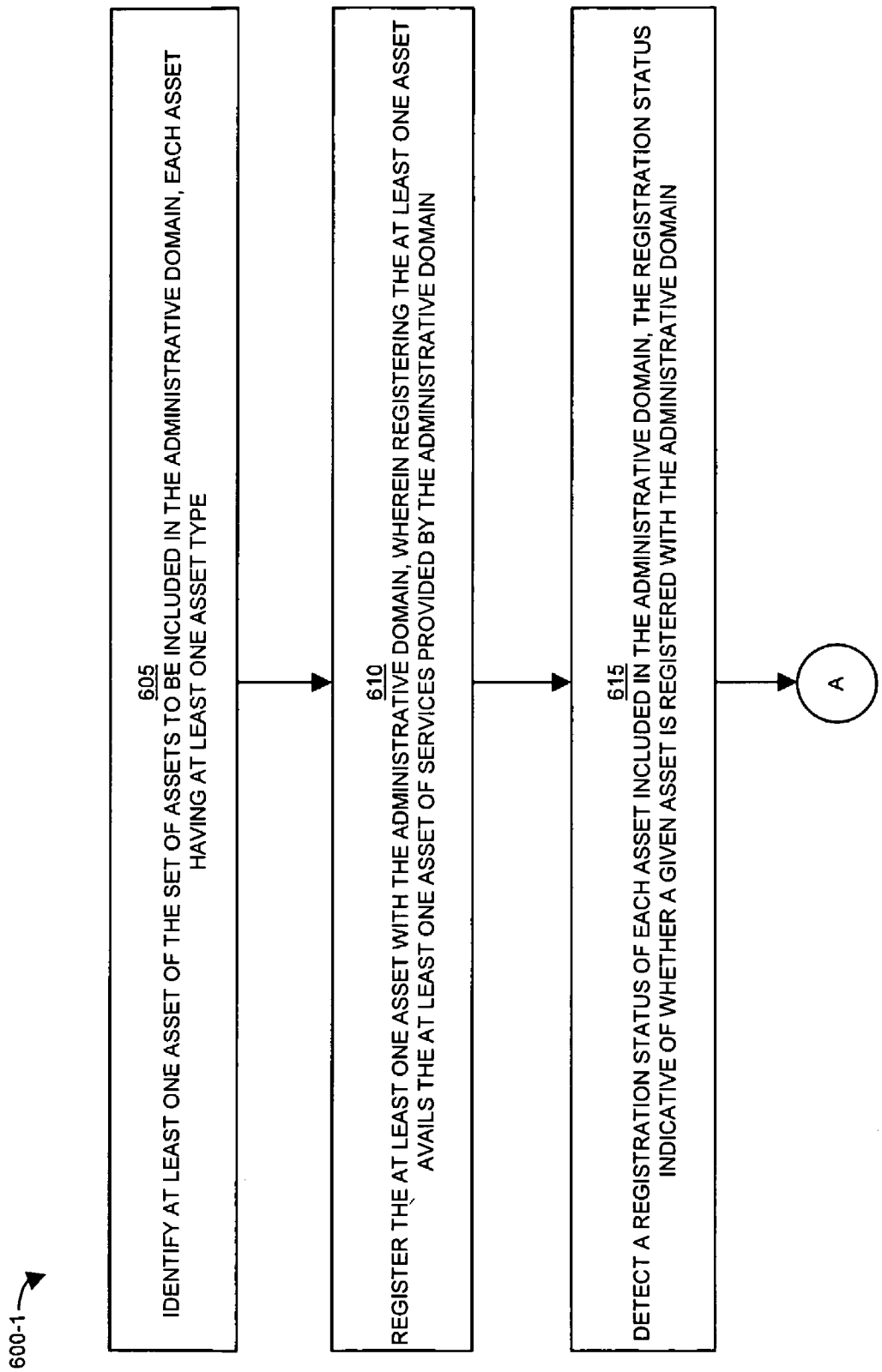
FIGS. 6 and 7 combine to form a flow chart of processing steps that shows processing operations performed by a domain manager in accordance with one example embodiment.
Figure 7:
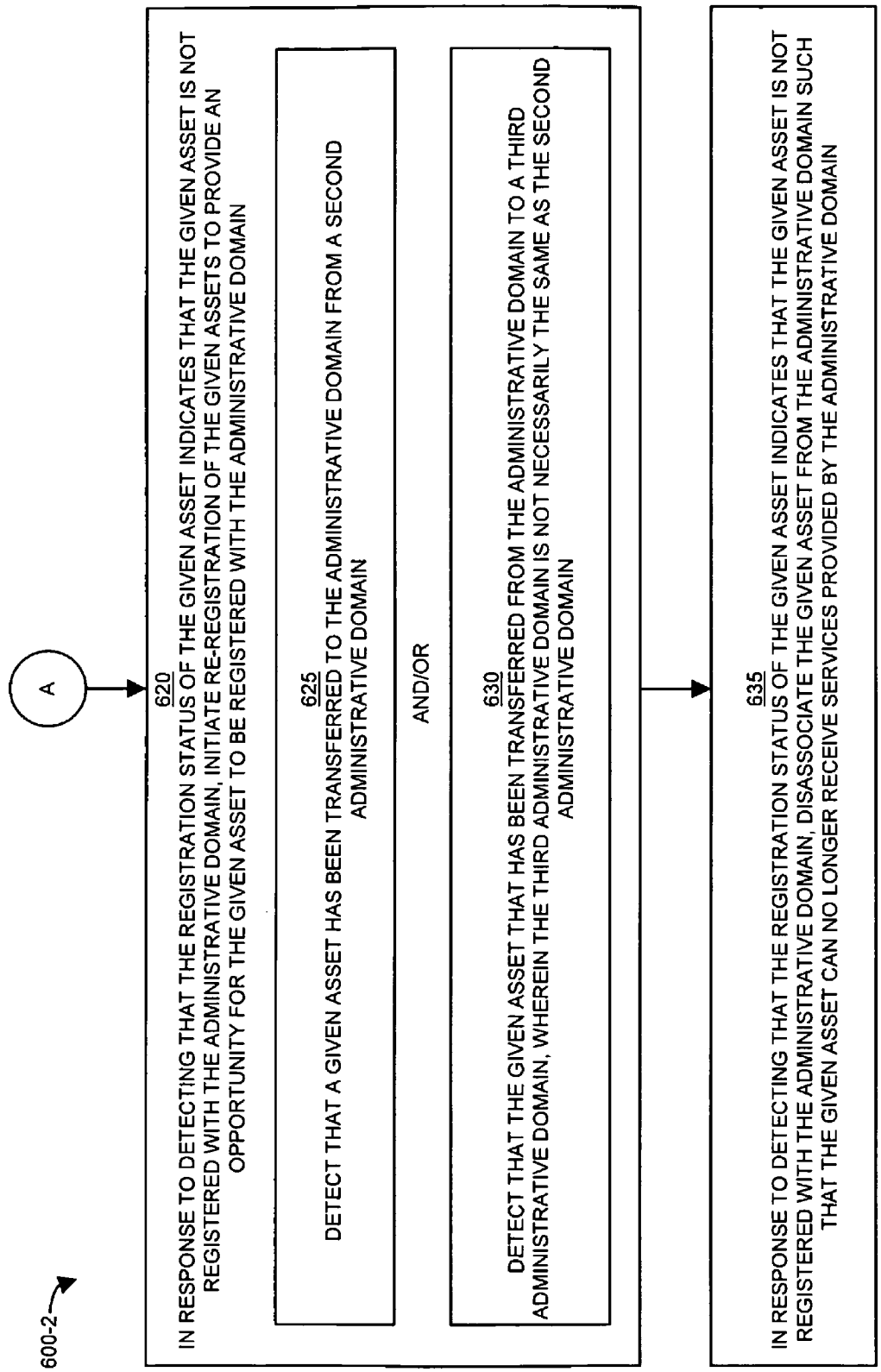

FIGS. 6 and 7 combine to form a flow chart 600 (e.g., flowchart 600-1 and flowchart 600-2) of processing steps that shows processing operations performed by the domain manager 150 in accordance with one example embodiment.

In step 605, the domain manager 150 identifies at least one asset of the set of assets to be included in the administrative domain such that each asset has at least one asset type.

In step 610, the domain manager 150 registers the asset with the administrative domain. According to one embodiment, registration avails the asset of services provided by the administrative domain.

In step 615, the domain manager 150 detects a registration status of each asset included in the administrative domain. In this manner, the registration status is indicative of whether a given asset is registered with the administrative domain.

In step 620, in response to detecting that the registration status of the given asset indicates that the given asset is not registered with the administrative domain, the domain manager 150 initiates re-registration of the given assets to provide an opportunity for the given asset to be registered with the administrative domain.

In step 625, the domain manager 150 detects that a given asset has been transferred to the administrative domain from a second administrative domain. In another embodiment, the domain manager 150 detects that the given asset has changed ownership from a different organization (e.g., company, university, etc.) and is now owned by the organization associated with the administrative domain.

In step 630, the domain manager 150 detects that the given asset that has been transferred from the administrative domain to a third administrative domain. In one embodiment, the third administrative domain is a different domain than the second administrative domain. Alternatively, in another embodiment, the third administrative domain is the same domain as the second administrative domain.

Similar to the example above, the domain manager 150 can also detect that the given asset has changed ownership to a different organization (e.g., company, university, etc.) and is now no longer owned by the organization associated with the administrative domain.

In step 635, in response to detecting that the registration status of the given asset indicates that the given asset is not registered with the administrative domain, the domain manager 150 disassociates the given asset from the administrative domain such that the given asset can no longer receive services provided by the administrative domain. For example, in one embodiment the domain manager 150 disassociates an asset by terminating or revoking the registration associated with that particular asset.

According to another embodiment, for each asset in the administrative domain, the domain manager 150 determines whether each asset has an associated service tag (e.g., via a scan of the assets in the domain). The service tag can be provided by a registration client that manages registration of assets in the administrative domain. More specifically, the service tag identifies context information associated with the asset including information such as a unique identifier for the asset, registration data, if any, associated with the administrative domain (e.g., start date, expiration date, group/domain membership, etc.), local resource information (e.g., operating system, hardware configuration, etc.).

In response to determining that the asset does not have an associated service tag, the domain manager 150 can initiate re-registration of the asset with the administrative domain via the registration client. In such an example scenario, the registration client provides the asset with a unique service tag, if applicable, upon registration with the administrative domain. Accordingly, the unique service tag is indicative of asset membership with the administrative domain.

Figure 8:
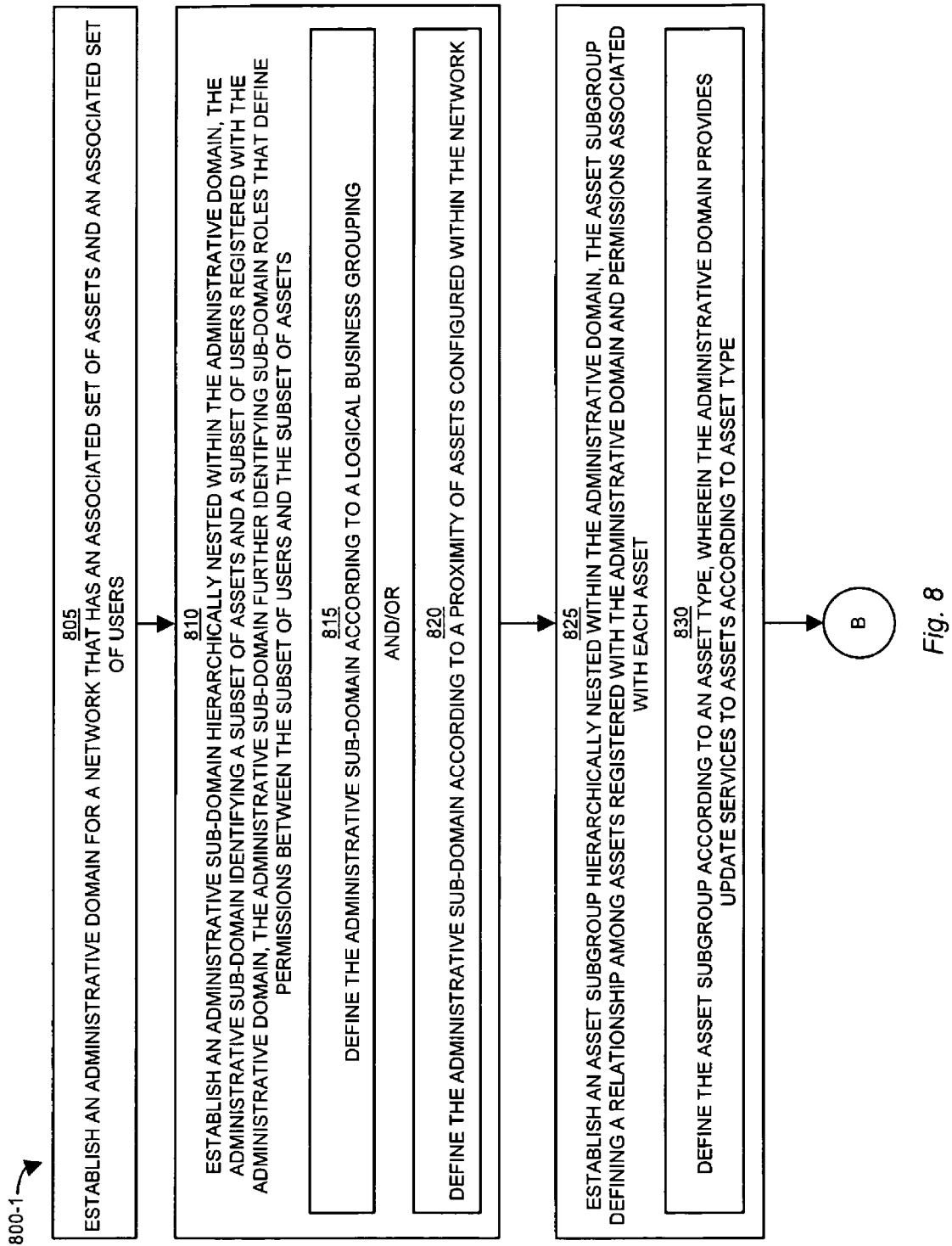
FIGS. 8 and 9 combine to form a flow chart of processing steps that shows processing operations performed by a domain manager in accordance with one example embodiment.
Figure 9:
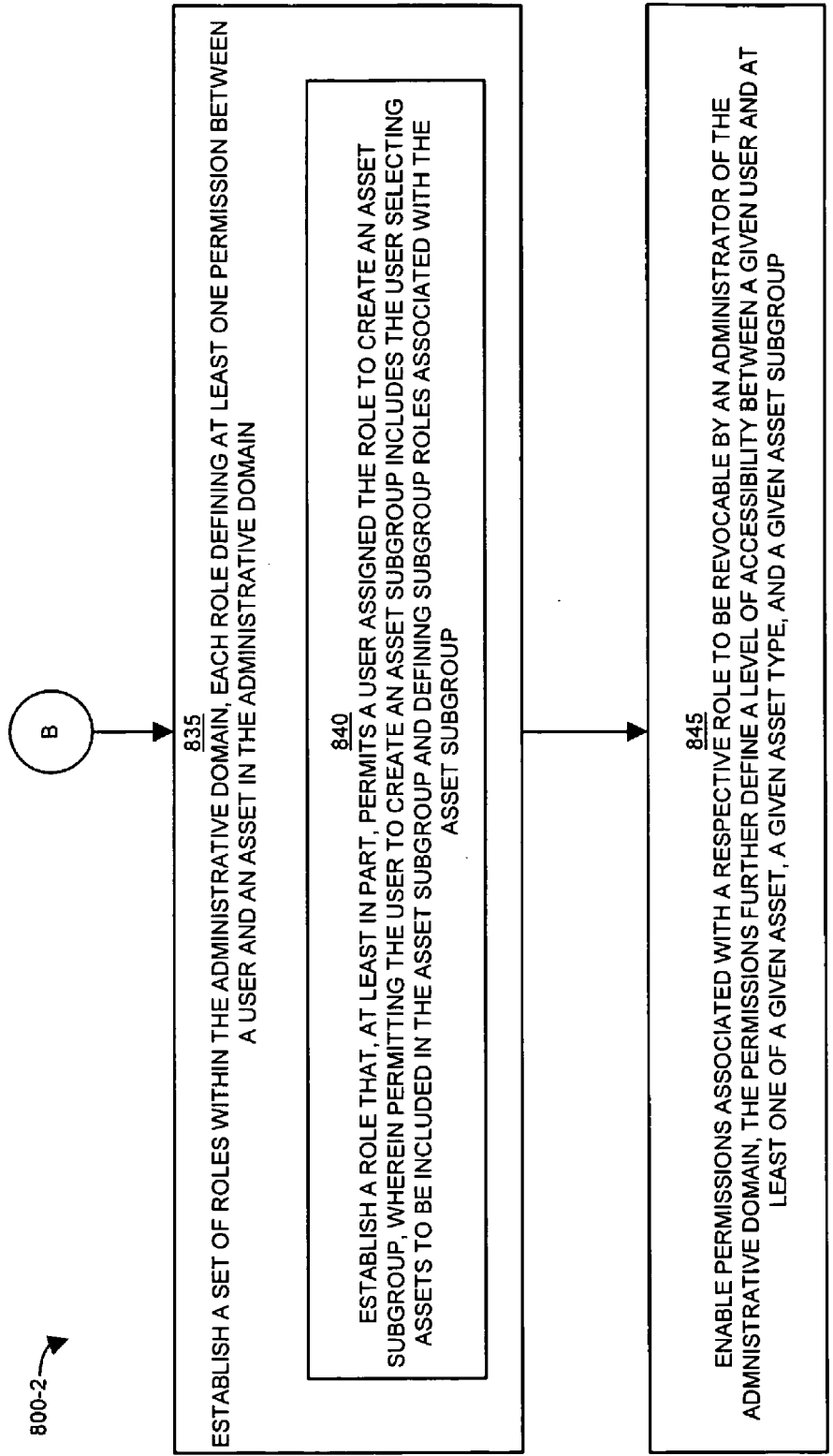

FIGS. 8 and 9 combine to form a flow chart 800 (e.g., flowchart 800-1 and flowchart 800-2) of processing steps that shows processing operations performed by the domain manager 150 in accordance with one example embodiment.

In step 805, the domain manager 150 establishes an administrative domain for a network that has an associated set of assets and an associated set of users.

In step 810, the domain manager 150 establishes an administrative sub-domain hierarchically nested within the administrative domain (e.g., administrative domain 340 and 370 as shown in the example embodiment of FIG. 3). The administrative sub-domain can identify a subset of assets and a subset of users registered with the administrative domain. Moreover, in one embodiment the administrative sub-domain identifies sub-domain roles that define permissions between the subset of users and the subset of assets.

In step 815, the domain manager 150 defines the administrative sub-domain according to a logical business grouping. For example, an administrative sub-domain can be organized according to such logical business groupings as accounting, marketing, engineering, sales, corporate, legal, etc.

In step 820, the domain manager 150 defines the administrative sub-domain according to a proximity of assets configured within the network. Like the example administrative environment 300 of FIG. 3, administrative sub-domains can be organized according to location (e.g., Broomfield, Santa Clara, 10$^{th}$ floor, Research and Development Lab, etc.).

In step 825, the domain manager 150 establishes an asset subgroup hierarchically nested within the administrative domain. The asset subgroup defines a relationship among assets registered with the administrative domain. More specifically, as in one example embodiment, an asset subgroup is defined according to an asset type (e.g., "Unix", "Solaris", "Operating Systems", "Workstations", etc.). With this configuration, the administrative domain can provide update services to assets according to asset type.

In step 835, the domain manager 150 establishes a set of roles within the administrative domain such that each role defines permissions between a user and an asset in the administrative domain.

In step 840, the domain manager 150 establishes a role that, at least in part, permits a user assigned the role to create an asset subgroup in the administrative domain. In one embodiment, such a role permits the user to select specific assets to be included in the asset subgroup and to define subgroup roles specific to the asset subgroup. For example, in the administrative domain 310 shown in FIG. 3, the "Group Admin" role 324 assigned to user Dick 314 may include privileges/permissions enabling user Dick 314 to create an asset group (e.g., asset group 335 "Test Systems") that contains assets A4 and A5.

In step 845, the domain manager 150 enables permissions associated with a respective role to be revocable by an administrator of the administrative domain. As described, the permissions define a level of accessibility and/or authority (e.g., read, write, update, monitor, asset subgroup creation, etc.) between a given user and a given asset, a given asset type, and/or a given asset subgroup.

Figure 10:
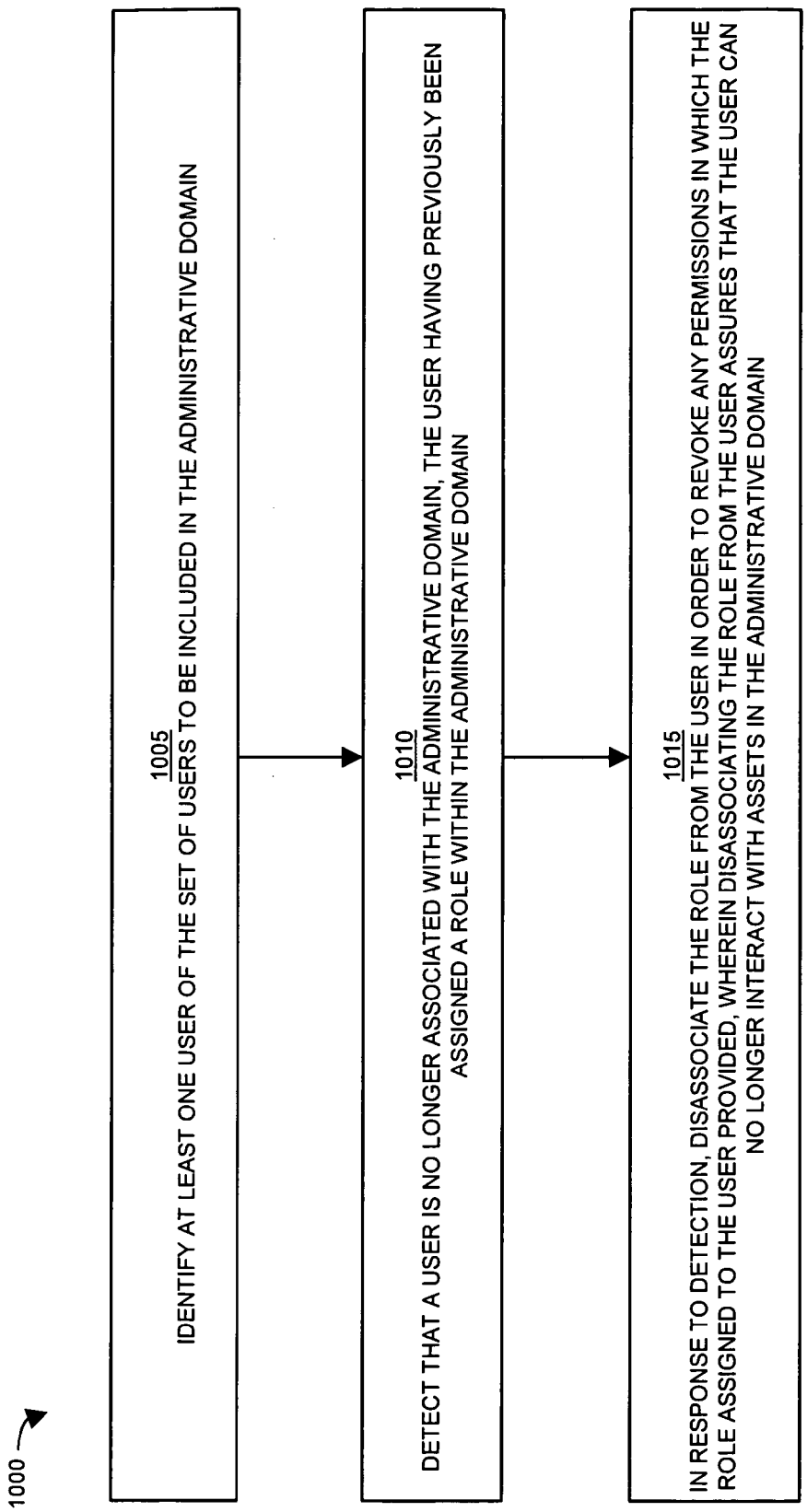
FIG. 10 is a flow chart of processing steps that shows processing operations performed by a domain manager in accordance with one example embodiment.

FIG. 10 is a flow chart 1000 of processing steps that shows processing operations performed by the domain manager 150 in accordance with one example embodiment.

In step 1005, the domain manager 150 identifies at least one user of the set of users to be included in the administrative domain.

In step 1010, domain manager 150 detects that a user, having previously been assigned a role within the administrative domain, is no longer associated with the administrative domain In step 1015, in response to detecting that the user is no longer associated with the administrative domain, the domain manager 150 disassociates the role from the user in order to revoke any permissions in which the role assigned to the user had provided. By disassociating the role from the user, the domain manager 150 assures that the user can no longer interact with assets in the administrative domain.

Referring again to the example embodiment of FIG. 3, assume that user Jill 372 moves from the Santa Clara office to the Broomfield office. By doing so, the domain manager 150 will detect (e.g., via a scan of administrative domain 370) that user Jill 372 is no longer a member of administrative domain 370. As a result, the domain manager 150 disassociates (e.g., revokes, terminates, etc.) the role 382 assigned to user Jill 372 such that user Jill 372 can no longer interact with assets in administrative domain 370.

While this invention has been particularly shown and described with references to preferred embodiments thereof, it will be understood by those skilled in the art that various changes in form and details may be made therein without departing from the spirit and scope of the present application as defined by the appended claims. Such variations are covered by the scope of this present disclosure. As such, the foregoing description of embodiments of the present application is not intended to be limiting. Rather, any limitations to the invention are presented in the following claims. Note that the different embodiments disclosed herein can be combined or utilized individually with respect to each other.

What is claimed is:

1. A computer system comprising:
   a processor;
   a memory unit that stores instructions associated with an application executed by the processor; and an interconnect coupling the processor and the memory unit, enabling the computer system to execute the application and perform operations of:

establishing an administrative domain for a network that has an associated set of assets and an associated set of users;

identifying at least one asset of the set of assets to be included in the administrative domain, each asset having at least one asset type, wherein each asset represents at least one of a software resource and a hardware resource detectable by a network, wherein identifying at least one asset of the set of asset to be included in the administrative domain comprises:

registering the at least one asset with the administrative domain, wherein registering the at least one asset avails the at least one asset of services provided by the administrative domain;

identifying at least one user of the set of users to be included in the administrative domain;

establishing a set of roles within the administrative domain, each role defining at least one permission between a user and an asset in the administrative domain;

detecting that a user is no longer associated with the administrative domain, the user having previously been assigned a role within the administrative domain; and in response to detection, disassociating the role from the user in order to revoke any permissions in which the role assigned to the user provided, wherein disassociating the role from the user assures that the user can no longer interact with assets in the administrative domain.

2. The computer system of claim 1 further comprising:

establishing an administrative sub-domain hierarchically nested within the administrative domain, the administrative sub-domain identifying a subset of assets and a subset of users registered with the administrative domain, the administrative sub-domain further identifying sub-domain roles that define permissions between the subset of users and the subset of assets; and establishing an asset subgroup hierarchically nested within the administrative domain, the asset subgroup defining a relationship among assets registered with the administrative domain and permissions associated with each asset.

3. A computer system comprising:

a processor;

a memory unit that stores instructions associated with an application executed by the processor; and an interconnect coupling the processor and the memory unit, enabling the computer system to execute the application and perform operations of:

establishing an administrative domain for a network that has an associated set of assets and an associated set of users;

identifying at least one asset of the set of assets to be included in the administrative domain, each asset having at least one asset type, wherein each asset represents at least one of a software resource and a hardware resource detectable by a network, wherein identifying at least one asset of the set of asset to be included in the administrative domain comprises:

registering the at least one asset with the administrative domain, wherein registering the at least one asset avails the at least one asset of services provided by the administrative domain;

identifying at least one user of the set of users to be included in the administrative domain;

establishing a set of roles within the administrative domain, each role defining at least one permission between a user and an asset in the administrative domain;

detecting a registration status of each asset included in the administrative domain, the registration status indicative of whether a given asset is registered with the administrative domain; and in response to detecting that the registration status of the given asset indicates that the given asset is not registered with the administrative domain, initiating re-registration of the given assets to provide an opportunity for the given asset to be registered with the administrative domain.

4. The computer system of claim 3 further comprising:

establishing an administrative sub-domain hierarchically nested within the administrative domain, the administrative sub-domain identifying a subset of assets and a subset of users registered with the administrative domain, the administrative sub-domain further identifying sub-domain roles that define permissions between the subset of users and the subset of assets; and establishing an asset subgroup hierarchically nested within the administrative domain, the asset subgroup defining a relationship among assets registered with the administrative domain and permissions associated with each asset.

5. A tangible non-transitory computer-readable medium having instructions stored thereon, the instructions, when executed by a processing device, enabling the processing device to perform operations of:

establishing an administrative domain for a network that has an associated set of assets and an associated set of users;

identifying at least one asset of the set of assets to be included in the administrative domain, each asset having at least one asset type, wherein each asset represents at least one of a software resource and a hardware resource detectable by a network, wherein identifying at least one asset of the set of asset to be included in the administrative domain comprises:

registering the at least one asset with the administrative domain, wherein registering the at least one asset avails the at least one asset of services provided by the administrative domain;

identifying at least one user of the set of users to be included in the administrative domain;

establishing a set of roles within the administrative domain, each role defining at least one permission between a user and an asset in the administrative domain;

detecting that a user is no longer associated with the administrative domain, the user having previously been assigned a role within the administrative domain;

in response to detection, disassociating the role from the user in order to revoke any permissions in which the role assigned to the user provided, wherein disassociating the role from the user assures that the user can no longer interact with assets in the administrative domain;

detecting a registration status of each asset included in the administrative domain, the registration status indicative of whether a given asset is registered with the administrative domain; and in response to detecting that the registration status of the given asset indicates that the given asset is not registered with the administrative domain, initiating re-registration of the given assets to provide an opportunity for the given asset to be registered with the administrative domain.

* * * * *